Nov. 13, 1923. 1,473,918

W. A. WITTEN

RESILIENT WHEEL

Filed March 10, 1922

William A. Witten
Inventor

By John M. Gillman
Attorney

Patented Nov. 13, 1923.

1,473,918

UNITED STATES PATENT OFFICE.

WILLIAM A. WITTEN, OF DUNCAN, OKLAHOMA.

RESILIENT WHEEL.

Application filed March 10, 1922. Serial No. 542,654.

*To all whom it may concern:*

Be it known that I, WILLIAM A. WITTEN, a citizen of the United States, residing at Duncan, in the county of Stephens and State of Oklahoma, have invented certain new and useful Improvements in Resilient Wheels, of which the following is a specification.

This invention relates to new and useful improvements in vehicle wheels and pertains particularly to resilient wheels and to the arrangement and construction of the parts thereof.

The principal object of the invention is the provision of a wheel of the character described which shall give ample resiliency to the vehicle supported thereon, the wheel being constructed particularly with respect to simplicity and economical manufacture.

Another principal object of the invention is the provision of a wheel of this nature adapted to be attached to the felly of any wheel where resiliency is required, but particularly adapted for attachment to the regular felly of an automobile or other motor vehicle wheel, or which may be built onto the wheel permanently. The invention will be more clearly understood by reference to the following description, taken in connection with the accompanying drawing, forming part hereof, in which—

Referring more in detail to the drawings, 1—1 denote the spokes, 2 the hub and 3 the felly of an ordinary motor vehicle wheel.

Figure 1:
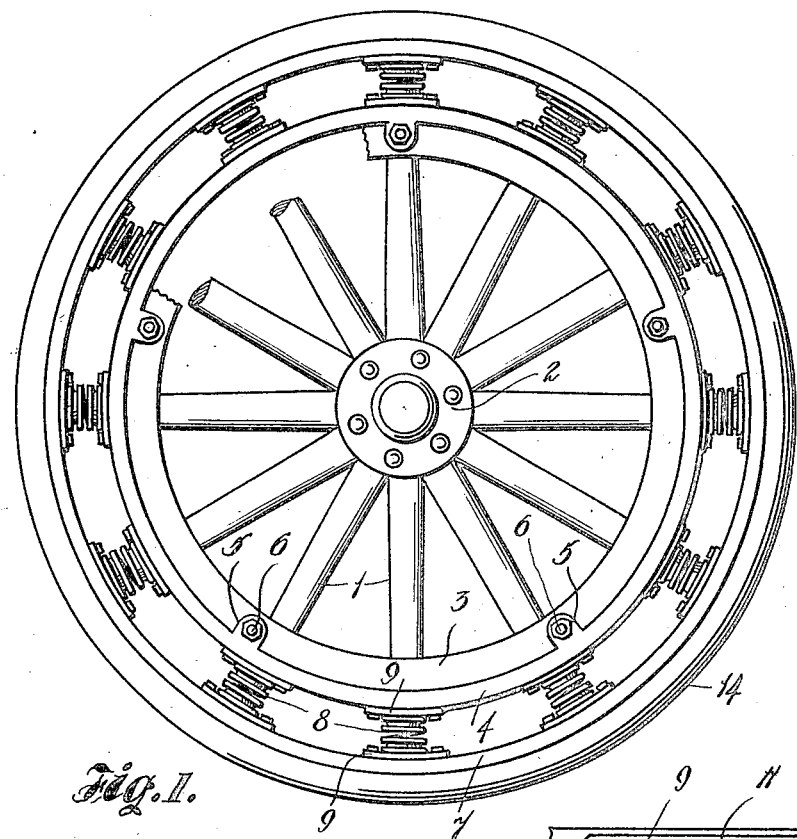
Figure 1 is an elevational view of a wheel of the resilient type and embodying the invention, with parts broken away for convenience of illustration.
Figure 3:
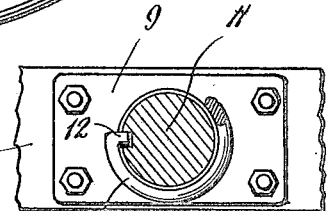
Figure 3 is a cross sectional view, taken on line 3—3 of Figure 2.
Figure 2:
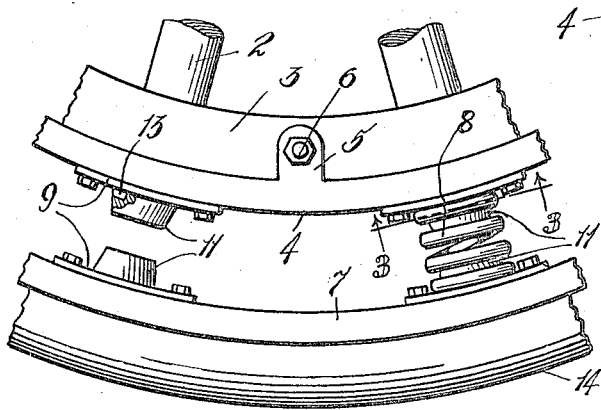
Figure 2 is an enlarged detail view of a portion of the spokes, felly and rims.

An inner rim 4 is provided with lugs 5—5 by means of which the rim 4 is detachably fastened to the felly 3 by bolts 6—6, or may be fastened to the felly 3 and built into the wheel permanently. An outer rim 7 is provided and is of larger diameter than the inner rim 4 to permit of an annular space between the inner and outer rims wherein are disposed a plurality of springs 8—8. Each end of these springs is seated upon a plate 9 having in its center a projecting cone-shaped protuberance 11 over which the spring is seated, the spring fitting snugly around the base of the cone-shaped protuberance and resting upon and against the plates 9—9 in the manner shown in Figure 2. One part of the spring at 12 has an inwardly turned end 12 receivable in a slot 13 in either one of the protuberances 11—11 or both of them if preferred. The projecting cone-shaped protuberance will prevent lateral play or movement of the outer rim 7 and wheel body, the inwardly turned end 12 of the springs preventing them from being dislodged from the plates. 14 is a solid rubber tire, but which may be of any type desired.

The inner rim 4 with the outer rim and springs and tire 14 may be slipped on and off the felly 3 in the same manner as when the ordinary pneumatic tire is removed and replaced with its rim to and from the felly 3 and secured in the same manner by lugs 5—5 thereto.

What is claimed is—

A resilient wheel including inner and outer spaced rims, base plates carried by the rims in the space therebetween, cone-shaped protuberances carried by the base plates and each having a radial opening located close to the base plate, the protuberances of the respective rims being located opposite to each other, and coil springs surrounding the opposed protuberances and seated on the base plates thereof and having their ends turned inwardly at a sharp angle and engaged in the respective openings.

In testimony whereof I have signed my name to this specification.

WILLIAM A. WITTEN.